(12) United States Patent
Erhart et al.

(10) Patent No.: US 12,487,132 B2
(45) Date of Patent: Dec. 2, 2025

(54) TEMPERATURE-DEPENDENT RESISTOR NETWORK FOR TEMPERATURE ANOMALY MONITORING IN A BATTERY SYSTEM

(71) Applicant: SAMSUNG SDI CO., LTD., Yongin-si (KR)

(72) Inventors: Michael Erhart, Yongin-si (KR); Peter Parz, Yongin-si (KR); Gernot Kraberger, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 742 days.

(21) Appl. No.: 17/328,224

(22) Filed: May 24, 2021

(65) Prior Publication Data

US 2021/0372861 A1    Dec. 2, 2021

(30) Foreign Application Priority Data

May 29, 2020    (EP) ..................................... 20177391
May 21, 2021    (KR) ........................ 10-2021-0065692

(51) Int. Cl.
*G01K 7/24*    (2006.01)
*G01K 3/06*    (2006.01)

(52) U.S. Cl.
CPC .................................... *G01K 7/24* (2013.01); *G01K 3/06* (2013.01)

(58) Field of Classification Search
CPC .................................... G01K 7/24; G01K 3/06
See application file for complete search history.

(56) References Cited

U.S. PATENT DOCUMENTS 3,461,272 A * 8/1969 Hirsbrunner ........... H03K 19/02
                                                        219/505
6,152,597 A * 11/2000 Potega ............... H01M 10/4257
                                                        327/512

(Continued)

FOREIGN PATENT DOCUMENTS

DE    10 2010 010 144 A1    9/2011
EP          3525279 A1 *    8/2019    .......... H01M 10/486

(Continued)

OTHER PUBLICATIONS

EESR from EP Application No. 20177391.8, Oct. 16, 2020.
Notice of Allowance dated Aug. 23, 2023, of the corresponding Korean Patent Application No. 10-2021-0065692.

*Primary Examiner* — Lisa M Caputo
*Assistant Examiner* — Nyla Gavia
(74) *Attorney, Agent, or Firm* — Lee IP Law, P.C.

(57) ABSTRACT

A monitoring system for monitoring the temperature of a battery module having a plurality of battery cells, the monitoring system including an electric network including a plurality of thermistors, wherein each of the thermistors is thermally connected to a battery cell, a monitoring device that is adapted to measure a total resistance ($R_{tot}$) of the electric network including the plurality of thermistors and is further adapted to generate a signal in case of detecting that the value of the total resistance ($R_{tot}$) of the electric network traverses a predetermined threshold resistance value, wherein the monitoring system is adapted to determine a mean temperature ($T_{amb}$) of the battery module independently from the measurement of the total resistance ($R_{tot}$) of the electric network, and wherein the predetermined threshold resistance value is dependent on the mean temperature ($T_{amb}$) of the battery module.

11 Claims, 6 Drawing Sheets

(56) References Cited

U.S. PATENT DOCUMENTS

| | | | |
|---|---|---|---|
| 11,569,535 B1 * | 1/2023 | Mische | H01M 50/249 |
| 2009/0317699 A1 * | 12/2009 | Gao | H01M 10/637 |
| | | | 429/62 |
| 2011/0210703 A1 * | 9/2011 | Souza | H01M 50/581 |
| | | | 320/136 |
| 2016/0268647 A1 * | 9/2016 | Umemura | H02J 7/007194 |
| 2019/0379089 A1 | 12/2019 | Kim et al. | |
| 2020/0274375 A1 * | 8/2020 | Griffiths | H02J 7/24 |

FOREIGN PATENT DOCUMENTS

| | | | | |
|---|---|---|---|---|
| EP | 3579300 A1 | 12/2019 | | |
| EP | 3566259 B1 * | 3/2023 | | G01R 31/392 |
| JP | 2000-277175 A | 10/2000 | | |
| JP | 2001211559 A * | 8/2001 | | H02J 7/0026 |
| JP | 2007-123287 A | 5/2007 | | |
| JP | 2013097901 A * | 5/2013 | | H01M 10/486 |
| JP | 2019002795 A * | 1/2019 | | |
| KR | 10-2017-0054045 A | 5/2017 | | |
| KR | 10-1749730 B1 | 6/2017 | | |
| KR | 10-2019-0139592 A | 12/2019 | | |
| WO | WO-2020166860 A1 * | 8/2020 | | G01K 1/026 |

* cited by examiner

TEMPERATURE-DEPENDENT RESISTOR NETWORK FOR TEMPERATURE ANOMALY MONITORING IN A BATTERY SYSTEM

CROSS-REFERENCE TO RELATED APPLICATIONS

European Patent Application No. 20177391.8, filed on May 29, 2020, in the European Intellectual Property Office, and entitled: "Temperature-Dependent Resistor Network for Temperature Anomaly Monitoring in a Battery System," and Korean Patent Application No. 10-2021-0065692, filed on May 21, 2021, are incorporated by reference herein in their entirety.

BACKGROUND

1. Field

Embodiments relate to a monitoring system for monitoring the temperature of a battery system/battery module

2. Description of the Related Art

Vehicles for transportation of goods and people have been developed using electric power as a source for motion. Such an electric vehicle is an automobile that is propelled by an electric motor, using energy stored in rechargeable batteries. An electric vehicle may be solely powered by batteries or may be a form of hybrid vehicle additionally powered by for example a gasoline generator. Furthermore, the vehicle may include a combination of electric motor and a combustion engine. In general, an electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or prismatic, depends on the battery's intended purpose. Lithium-ion (and similar lithium polymer) batteries, widely known via their use in laptops and consumer electronics, dominate the most recent group of electric vehicles in development.

Rechargeable batteries may be used as a battery system or battery module (the latter terms may be used interchangeably) formed of a plurality of unit battery cells coupled in series and/or in parallel so as to provide a high energy density, in particular for motor driving of a hybrid or fully electric vehicle. That is, the battery module is formed by interconnecting the electrode terminals of the plurality of unit battery cells depending on a required amount of power and in order to realize a high-power rechargeable battery.

A battery pack is a set of any number of (preferably identical) battery modules. They may be configured in a series, parallel or a mixture of both to deliver the desired voltage, capacity, or power density. Components of battery packs include the individual battery modules, and the interconnects, which provide electrical conductivity between them.

SUMMARY

Embodiments are directed to a monitoring system for monitoring the temperature of a battery module having a plurality of battery cells, the monitoring system including: an electric network including a plurality of thermistors, wherein each of the thermistors is thermally connected to a battery cell; a monitoring device that is adapted to measure a total resistance ($R_{tot}$) of the electric network including the plurality of thermistors and is further adapted to generate a signal in case of detecting that the measured total resistance ($R_{tot}$) of the electric network traverses a predetermined threshold resistance value; wherein the monitoring system is adapted to determine a mean temperature ($T_{amb}$) of the battery module independently from the measurement of the total resistance ($R_{tot}$) of the electric network; and wherein the predetermined threshold resistance value is dependent on the mean temperature ($T_{amb}$) of the battery module.

The number of thermistors may be smaller or equal to the number of battery cells, and each battery cell may be connected to at most one thermistor and each thermistor may be connected to one and only one battery cell.

The electric network may be a parallel connection of the thermistors or the electric network may be a series connection of the thermistors.

The electric network may be adapted such that the total resistance ($R_{tot}$) of the electric network decreases when a temperature of at least one of the thermistors increases and temperature of the remaining thermistors is constant; and the monitoring device may be adapted to generate the signal when the value of the total resistance ($R_{tot}$) of the electric network falls below the predetermined threshold resistance value.

Each of the thermistors may be a negative thermal coefficient thermistor.

The electric network may be adapted such that the total resistance ($R_{tot}$) of the electric network increases when a temperature of at least one of the thermistors increases and temperature of the remaining thermistors is constant; and the monitoring device may be adapted to generate the signal when the value of the total resistance ($R_{tot}$) of the electric network exceeds the predetermined threshold resistance value.

Each of the thermistors may be a positive thermal coefficient thermistor.

The monitoring system may further include at least one additional temperature sensor, and the monitoring device may be adapted to use the signal of the at least one additional temperature sensor to determine the mean temperature ($T_{amb}$) of the battery module.

The monitoring system may be adapted to detect resistance values of at least one of the thermistors separately, and the monitoring device may be adapted to use the detected resistance values of the separately detected thermistors to determine the mean temperature ($T_{amb}$) of the battery module.

Embodiments are also directed to a battery module having a plurality of battery cells, the battery module including a monitoring system according to an embodiment.

Embodiments are also directed to a method for monitoring temperature of battery cells of a battery module, the method including a) detecting a mean temperature ($T_{amb}$) of the battery module; b) determining a threshold resistance value in dependence of the detected mean temperature ($T_{amb}$) of the battery module; c) measuring a total resistance ($R_{tot}$) of an electric network including a plurality of thermistors, wherein each of the thermistors is thermally connected to a battery cell; d) generating a signal in case of detecting that the measured total resistance ($R_{tot}$) of the electric network measured in c) traverses the determined threshold resistance value.

In the method, a) to d) may be repeated during use of the battery module.

The electric network may be a parallel connection of the thermistors or the electric network may be a series connection of the thermistors.

Each of the thermistors may be a negative thermal coefficient thermistor, and d) may include generating the signal when the value of the total resistance ($R_{tot}$) of the electric network measured in c) falls below the determined threshold resistance value.

Each of the thermistors may be a positive thermal coefficient thermistor, and d) may include generating the signal when the value of the total resistance ($R_{tot}$) of the electric network measured in c) exceeds the determined threshold resistance value.

BRIEF DESCRIPTION OF THE DRAWINGS

Features will become apparent to those of skill in the art by describing in detail example embodiments with reference to the attached drawings in which.

DETAILED DESCRIPTION

Figure 1:
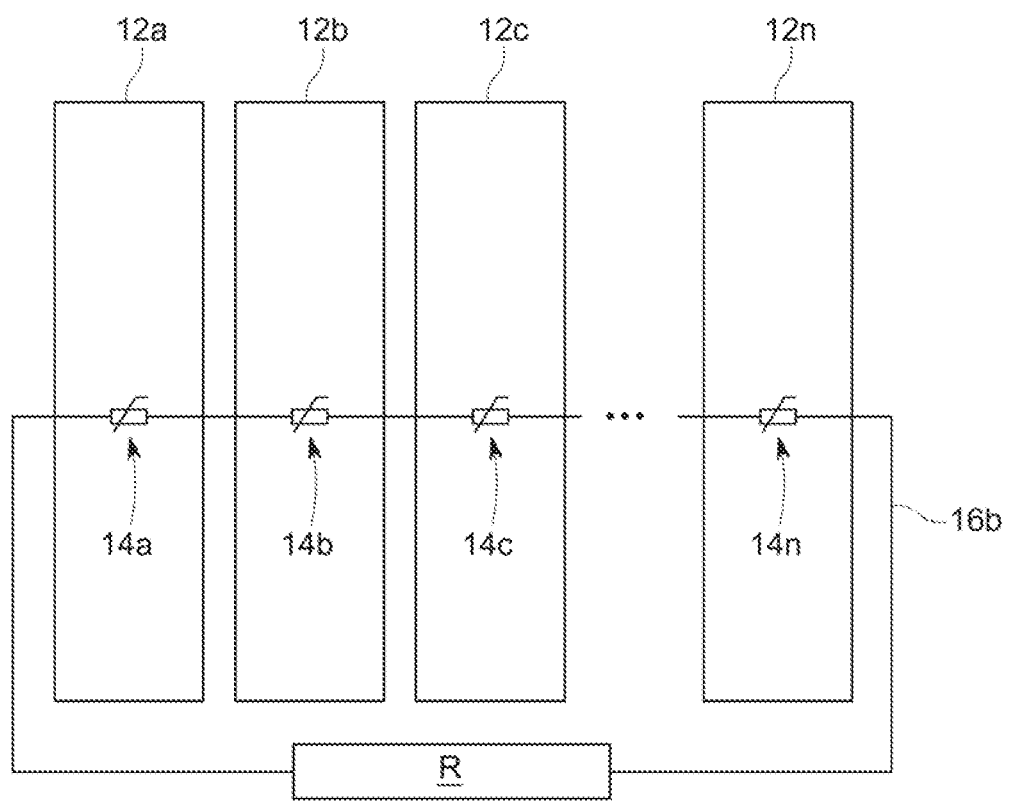
FIG. 1 is a schematic drawing of a battery cell stack consisting of individual cells, where each cell is equipped with a temperature-dependent resistor, and wherein the resistors are electrically connected using a serial connection.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

An example embodiment may provide a monitoring system for monitoring the temperature of a battery module having a plurality of battery cells, the monitoring system including: an electric network including a plurality of thermistors, wherein each of the thermistors is thermally connected to a battery cell; a monitoring device being adapted for measuring a total electric resistance of the electric network including the plurality of thermistors and further being adapted for generating a signal in case of detecting that the value of the total resistance of the electric network traverses a predetermined threshold resistance value; wherein the monitoring system is adapted to determine a mean temperature of the battery module independently from the measurement of the total resistance of the electric network; and wherein the predetermined threshold resistance value is dependent on the mean temperature of the battery module.

In the context of this invention, the term "plurality" refers to a number of two or more entities, e.g., "a plurality of battery cells" denotes two or more battery cells and "a plurality of thermistors" means two or more thermistors.

Further, the expression "resistance" refers to the electric resistance (of a temperature-dependent resistor or a network of such temperature-dependent resistors).

Also, the expression "mean temperature" may refer to the average temperature within the battery module/battery pack, or the "mean temperature" may refer to a temperature measured somewhere (at some point) in the battery module/battery pack, and it is assumed that this point is in thermal equilibrium or at least approximately in thermal equilibrium with the whole battery module/battery pack.

Also, the expression "value of the total resistance of the electric network" may refer to an absolute value of the total resistance of the electric network, or may refer to a relative value of the total resistance of the electric network, i.e., to the absolute value of the total resistance of the electric network relative to the resistance value corresponding to the ambient temperature of the battery cells in the battery module/battery pack (or relative to the mean temperature within the battery module/battery pack).

An example embodiment may provide a monitoring system that allows for a detection of temperature anomalies of cells in a battery module/battery pack using a network of temperature-sensitive resistors.

According to an example embodiment of the monitoring system, the number of thermistors is smaller than the number of battery cells, and each battery cell is connected to at most one thermistor and each thermistor is connected to one and only one battery cell. According to an example embodiment of the monitoring system, the number of thermistors is equal to the number of battery cells, and each battery cell is connected to one thermistor and each thermistor is connected to one and only one battery cell.

According to an example embodiment of the monitoring system, the electric network is a parallel connection of the thermistors. According to an example embodiment of the monitoring system, the electric network is a series connection of the thermistors.

According to an example embodiment of the monitoring system, the thermistors mounted on a first subset of the battery cells form a first network having a first net resistance value, the thermistors mounted on a second (e.g., disjoint) subset of the battery cells form a second network with a second net resistance value, and the first and the second net resistance value are monitored and analyzed separately. Thus, embodiments may be implemented with all cells of a battery forming one and only one network, or may be implemented using several independent networks of temperature-dependent resistors (such as thermistors) within one battery module.

According to an example embodiment of the monitoring system, the electric network is adapted such that the total resistance of the network decreases, as the temperature to which at least one of the thermistors is/are exposed increases, while the temperature to which the remaining thermistors are exposed remains constant; and the monitoring device is adapted for generating a signal in case of measuring that the value of the total resistance of the electric network falls below the predetermined threshold resistance value. This embodiment is in particular suitable to detect an overtemperature (such as a thermal runaway) of one or more cells in the battery module. However, embodiments of the battery system may also aim at detecting an undertemperature; in the latter case, the monitoring device is rather adapted for generating a signal in case of measuring that the value of the total resistance of the electric network exceeds the predetermined threshold resistance value. Also, embodiments may detect both overtemperature and undertemperature of one or more cells in the battery module; in the latter case, the monitoring device may be adapted for generating a signal in case of measuring that the value of the total resistance of the electric network falls below a predetermined first threshold resistance value or exceeds a predetermined second threshold resistance value. According to an example embodiment of the monitoring system, each of the thermistors is a negative thermal coefficient (NTC) thermistor.

According to an example embodiment of the monitoring system, the electric network is adapted such that the total resistance of the network increases, as the temperature to which at least one of the thermistors is/are exposed increases, while the temperature to which the remaining thermistors are exposed remains constant; and the monitoring device is adapted for generating a signal in case of measuring that the value of the total resistance of the electric network exceeds the predetermined threshold resistance value. This embodiment is in particular suitable to detect an overtemperature (such as a thermal runaway) of one or more cells in the battery module. However, embodiments of the battery system may also aim at detecting an undertemperature; in the latter case, the afore-described monitoring device may be rather adapted for generating a signal in case of measuring that the value of the total resistance of the electric network falls below the predetermined threshold resistance value. Also, embodiments may detect both overtemperature and undertemperature of one or more cells in the battery module; in the latter case, the monitoring device may be adapted for generating a signal in case of measuring that the value of the total resistance of the electric network exceeds a predetermined first threshold resistance value or falls below a predetermined second threshold resistance value. According to an example embodiment of the monitoring system, each of the thermistors is a positive thermal coefficient (PTC) thermistor.

According to an example embodiment of the monitoring system, the monitoring system further includes at least one additional temperature sensor, wherein the monitoring device is adapted to use the signal of the at least one additional temperature sensor to determine the mean temperature of the battery module.

According to an example embodiment of the monitoring system, the monitoring system is adapted to detect the resistance of at least one of the thermistors separately, wherein the monitoring device is adapted to use the resistance values of the separately detected thermistors to determine the mean temperature of the battery module. In this context, the expression "detect[ing] the resistance of at least one of the thermistors separately" means that the resistance of the at least one of the thermistors (not including all of the thermistors) is detected independently from the resistance of the remaining thermistors or the total resistance of the network.

In an example embodiment, the monitoring device is integrated into a battery management unit (BMU) of the battery module.

Another example embodiment relates to a battery pack including a plurality of battery modules according to an embodiment. Another example embodiment relates to a vehicle including at least one battery module or at least one battery pack according to an embodiment.

According to an example embodiment, a method for monitoring temperature of battery cells of a battery module includes: a) detecting a mean temperature of the battery module; b) determining a threshold resistance value in dependence of the detected mean temperature of the battery module; c) measuring a total electric resistance of an electric network including a plurality of thermistors, wherein each of the thermistors is thermally connected to a battery cell; and d) generating a signal in case of detecting that the value of the total resistance of the electric network measured in c) traverses the determined threshold resistance value. Here, it is assumed that the battery module includes a plurality of battery cells. The definitions of the expressions "plurality," "resistance," "value of the total resistance of the electric network," and "mean temperature" as given above in the context of the monitoring system apply correspondingly in the context of the method. The method may allow for a detection of temperature anomalies of cells in a battery module/battery pack using a network of temperature-sensitive resistors.

According to an example embodiment of the method, operations a) to d) are permanently or continuously repeated when the battery module is to be monitored, e.g., when the battery module is in use. However, the battery module may also be monitored when it is in standby or not used.

According to an example embodiment of the method, the electric network is a parallel connection of the thermistors or wherein the electric network is a series connection of the thermistors.

According to an example embodiment of the method, each of the thermistors is a negative thermal coefficient (NTC) thermistor, and operations d) includes generating a signal in case of detecting that the value of the total resistance of the electric network measured in step c) falls below the determined threshold resistance value.

According to an example embodiment of the method, each of the thermistors is a positive coefficient (PTC) thermistor, and operation d) includes generating a signal in case of detecting that the value of the total resistance of the electric network measured in step c) exceeds the determined threshold resistance value.

The system and the method according to example embodiments may be used for measuring an overtemperature of an individual battery cell; overtemperature of a large number of cells may be detected using dedicated temperature sensors strategically placed on a few points in the module/battery pack (which are typically installed in the battery anyhow for temperature monitoring).

When detecting overtemperature of a battery cell, several actions can be taken, depending on the detected temperature value of the overheated cell: the cooling power that is requested from the vehicle can be increased, the allowed power outtake from the battery can be limited, or the operation of the battery pack can be limited or shut down.

According to an example embodiment, each cell inside a battery cell stack is equipped with a temperature-dependent resistor (for example, a positive thermal coefficient (PTC) thermistor or a negative thermal coefficient (NTC) thermistor) that is thermally coupled to the cell. In an implementation, a new cell-connecting unit (CCU) flexprint stripe may be used to install a temperature-dependent resistor at every cell at very low cost (typical price point per NTC: 0.02 €; status per December 2019).

Figure 2:
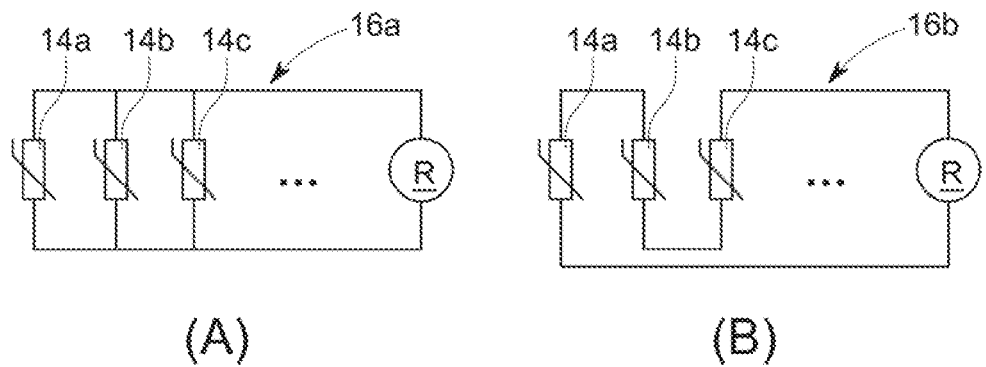
FIG. 2 illustrates schematically a parallel (A) and a serial (B) connection of the temperature-dependent resistors, a circuit for measuring the resistance being marked by "R"
Figure 3:
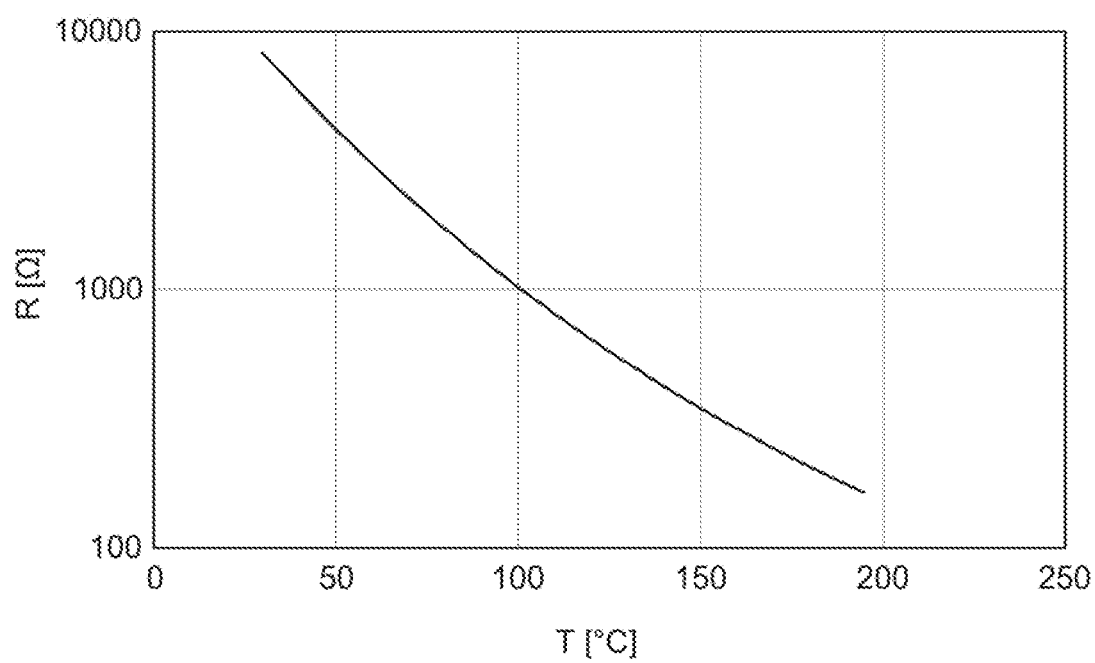
FIG. 3 is a diagram illustrating the temperature-dependent resistance of an example NTC resistor on a logarithmic scale for the ordinate (resistance) axis.

FIG. 1 is a schematic drawing of a battery cell stack consisting of individual cells, where each cell is equipped with a temperature-dependent resistor, and wherein the resistors are electrically connected using a serial connection. FIG. 2 illustrates schematically a parallel (A) and a serial (B) connection of the temperature-dependent resistors, a circuit for measuring the resistance being marked by "R". FIG. 3 is a diagram illustrating the temperature-dependent resistance of an example NTC resistor on a logarithmic scale for the ordinate (resistance) axis.

Referring to FIG. 1 a battery cell stack may include of individual cells $12a$, $12b$, $12c$, ..., $12n$, where each cell is equipped with a temperature-dependent resistor $14a$, $14b$, $14c$, ..., $14n$. The temperature-dependent resistors $14a$, $14b$, $14c$, ..., $14n$ may each be an NTC or a PTC thermistor (see above). As shown in FIG. 1, the temperature-dependent resistors $14a$, $14b$, $14c$, ..., $14n$ may be electrically connected by a serial connection $16b$ (see FIG. 2(B)). The serial connection of the resistors 14a, 14b, 14c, ..., 14n forms an electric network of a plurality of temperature-dependent resistors. In another implementation, a network may be formed by a parallel connection of the temperature-dependent resistors 14a, 14b, 14c, ..., 14n (see FIG. 2(A)). The resistance of the total network of temperature-dependent resistors 14a, 14b, 14c, ..., 14n may be measured using standard techniques for resistance measurement, for example, by the application of a known or measured voltage and current measurement via a shunt or magnetic measurement. The measurement of the total network resistance may be measured by a resistance measurement circuit R connected to the serial connection 16b of the resistors 14a, 14b, 14c, ..., 14n, as indicated in FIG. 1.

Although more complex connections (circuits) of temperature-dependent resistors may be employed, there are two main general ways of building up the circuit (network) of the resistors: serial and parallel connection. An electric network formed by a serial connection 16b of temperature-dependent resistors 14a, 14b, 14c, ... has been described above with reference to FIG. 1 and is, in a more schematic way and omitting the battery cells, also depicted in FIG. 2(B). In contrast to FIG. 2(B), an electric network formed by a parallel connection 16a of temperature-dependent resistors 14a, 14b, 14c, ... is schematically depicted in FIG. 2(A). In either case, the network is connected with a resistance measurement circuit R as described above in the context of FIG. 1. Then, in both cases, it can be detected by monitoring the total (overall) resistance of the network, when (at least) one cell in the battery stack connected to the network starts heating up.

In principle, if three or more resistors are used, also combinations of parallel and serial connections may be used, in particular, if either each of the resistors is of the PTC-type or if each of the resistors is of the NTC-type. In the following, however, it will be focused on networks including pure parallel or pure serial connections of n temperature-dependent resistors 14a, 14b, 14c, ..., 14n, wherein n≥2 is a positive integer.

A temperature-dependent resistor may be used that exhibits an exponential dependence on temperature. For instance, the resistance of an NTC resistor may be modeled using the following equation:

$$R(T) = R_0 \exp\left(B\left(\frac{1}{T} - \frac{1}{T_0}\right)\right)$$

which is parametrized by the value of the resistance $R_0$ at a fixed temperature $T_0$ and the parameter B.

For an example NTC resistor (e.g., a Murata NCP15X11103J03RC) and example parameters $R_0$=10 kΩ at $T_0$=25° C. and B=3380 K, the temperature-dependence of the resistance is shown in the diagram of FIG. 3, wherein the resistance of the NTC resistor is plotted over the temperature (note the logarithmic scale of the ordinate).

Due to the exponential dependence, a small change in temperature T leads to a large change in resistance R of the temperature-dependent resistor.

For measuring the temperature of each battery cell individually, the resistance of each of the temperature-dependent resistors applied to the cells may be measured separately. This may be used for temperature monitoring. However, an AFE (analog front end) chip may not have enough input channels to measure for each cell separately.

A more efficient way to detect temperature anomalies is to measure the total resistance $R_{tot}$ of a network of temperature-dependent resistors, where each of the resistors is applied to a different cell. One or several resistor networks may be implemented per module or per pack.

The mounting of the temperature-dependent resistor to the cell may be realized, e.g., by an integration inside the cell-connecting unit (CCU), which may be inexpensive if realized via flexprint.

General ways of building up the circuit of the resistors (e.g., serial and parallel connection) have already been described above.

Figure 4:
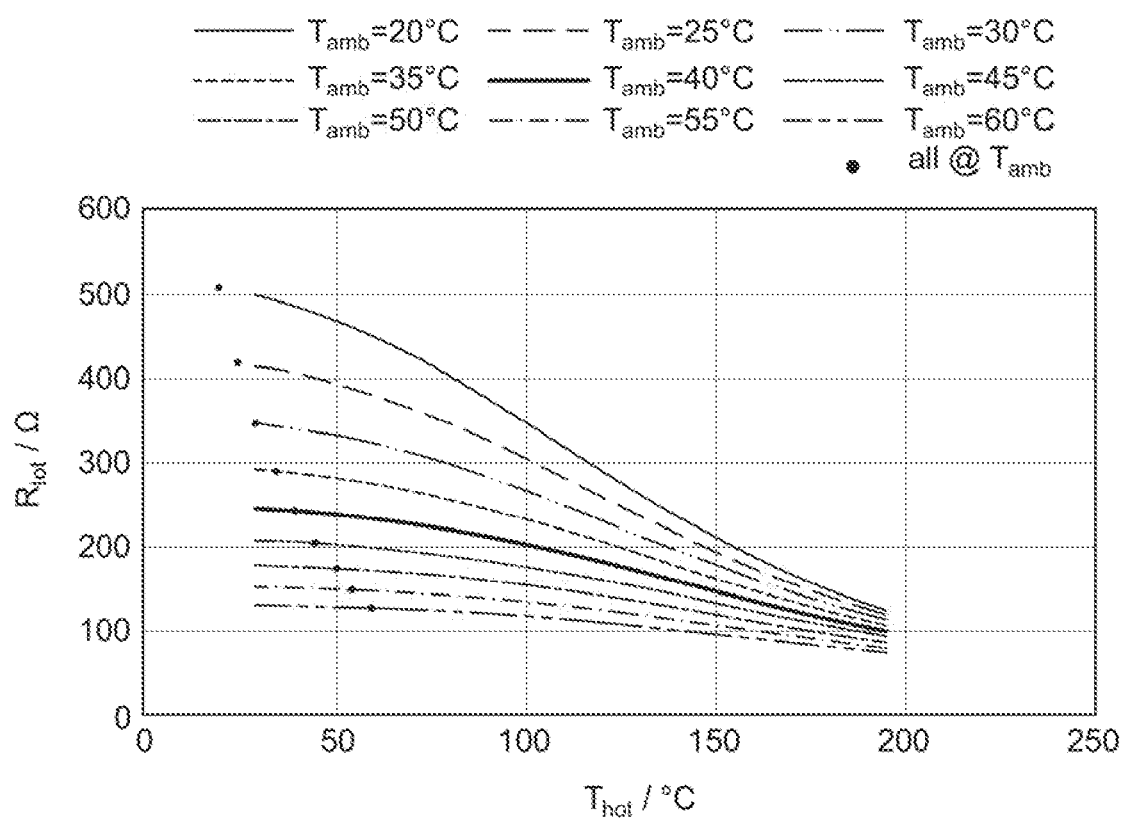
FIG. 4 is a diagram illustrating the total resistance of a parallel NTC network with 24 cells.
Figure 5A:
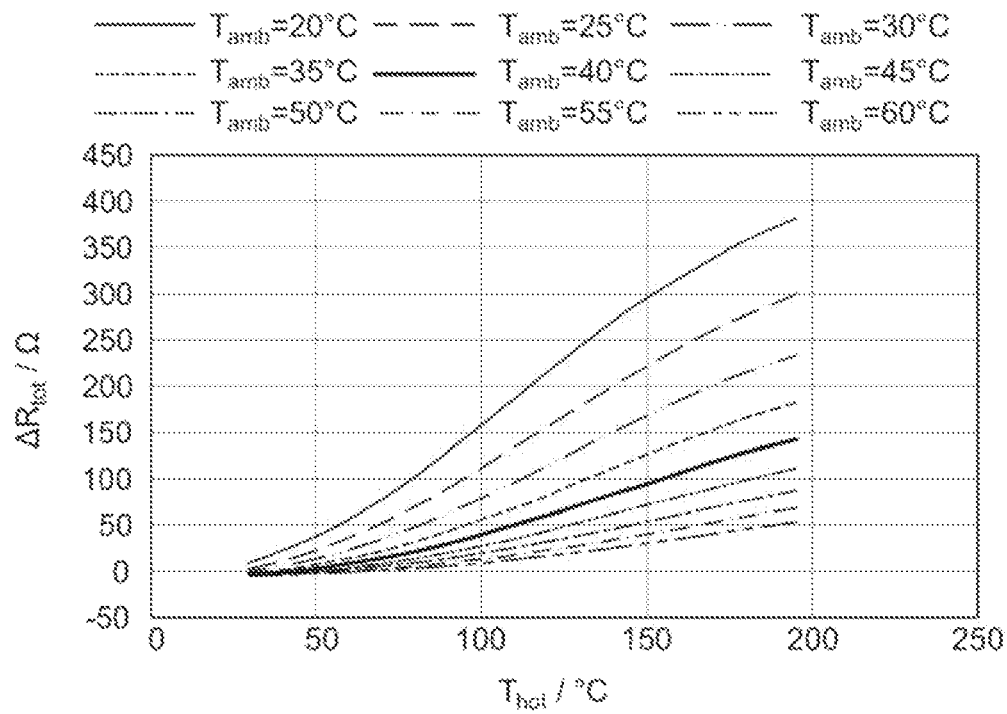
FIG. 5A is a diagram illustrating the detection of a single battery cell with overtemperature in a parallel NTC network with 24 cells, wherein the absolute difference between the two total resistances is plotted in the diagram.
Figure 5B:
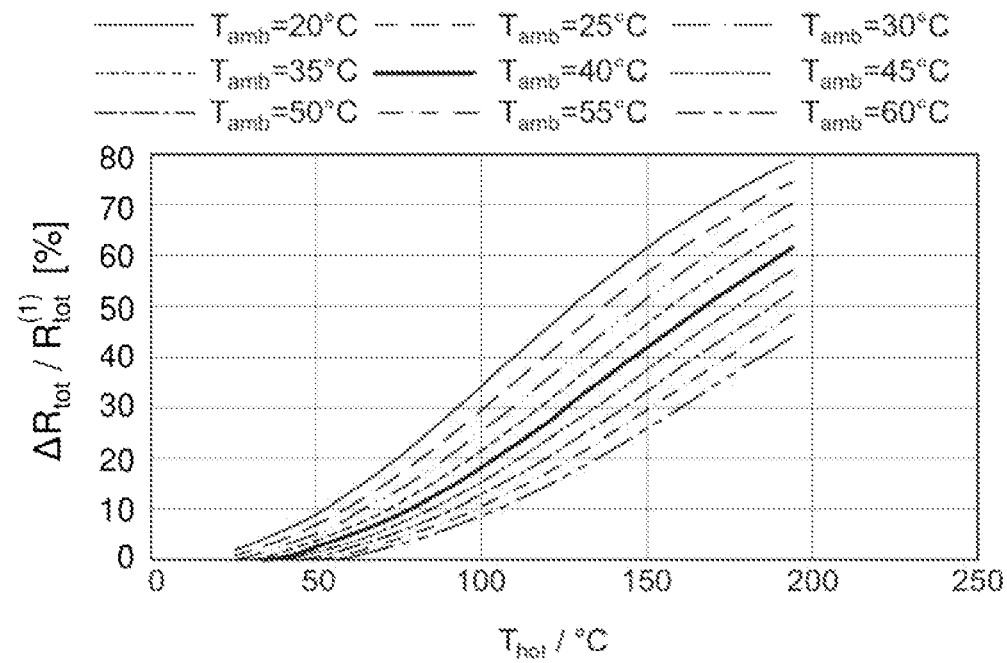
FIG. 5B is a diagram illustrating the detection of a single battery cell with overtemperature in a parallel NTC network with 24 cells, wherein the relative difference between the two total resistances is plotted in the diagram.
Figure 6A:
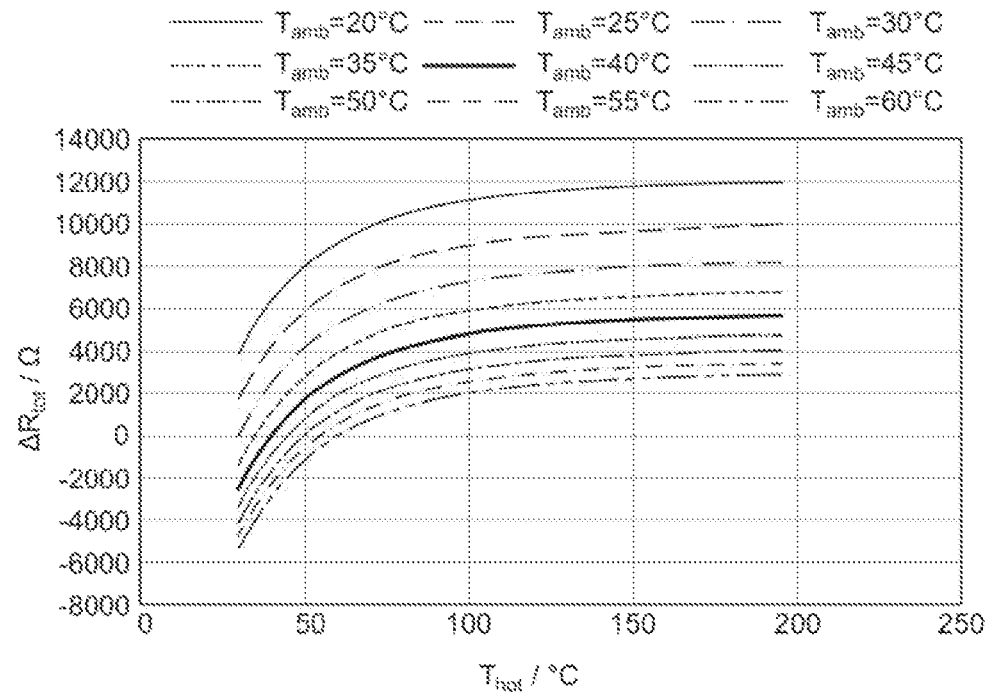
FIG. 6A is a diagram illustrating the detection of a single battery cell with overtemperature in a serial NTC network with 24 cells, wherein the absolute difference between the two total resistances is plotted in the diagram.
Figure 6B:
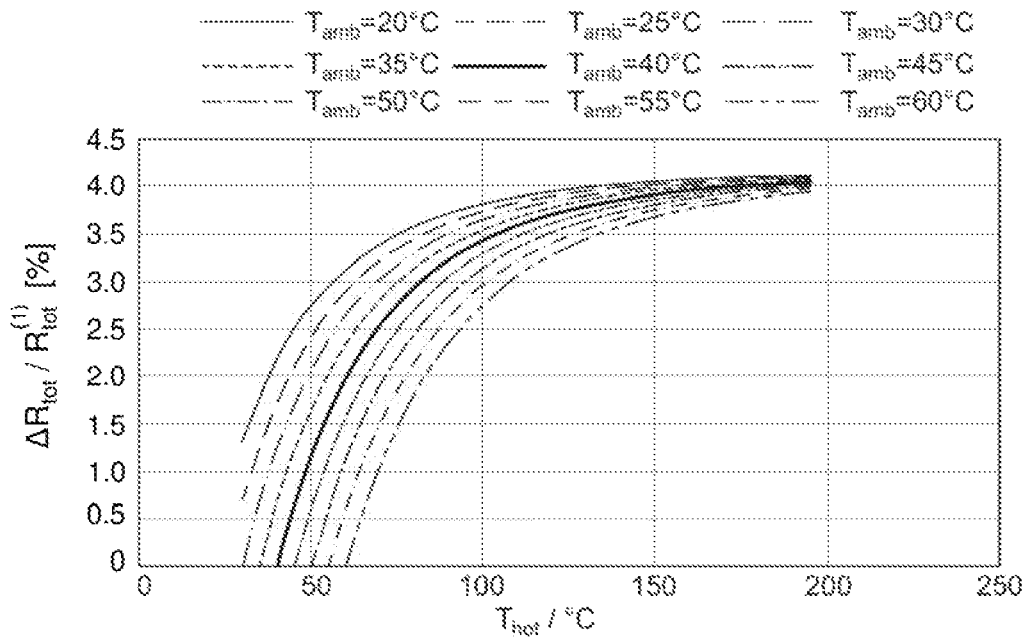
FIG. 6B is a diagram illustrating the detection of a single battery cell with overtemperature in a serial NTC network with 24 cells, wherein the relative difference between the two total resistances is plotted in the diagram.

FIG. 4 is a diagram illustrating the total resistance of a parallel NTC network with 24 cells. FIG. 5A is a diagram illustrating the detection of a single battery cell with overtemperature in a parallel NTC network with 24 cells, wherein the absolute difference between the two total resistances is plotted in the diagram. FIG. 5B is a diagram illustrating the detection of a single battery cell with overtemperature in a parallel NTC network with 24 cells, wherein the relative difference between the two total resistances is plotted in the diagram. FIG. 6A is a diagram illustrating the detection of a single battery cell with overtemperature in a serial NTC network with 24 cells, wherein the absolute difference between the two total resistances is plotted in the diagram. FIG. 6B is a diagram illustrating the detection of a single battery cell with overtemperature in a serial NTC network with 24 cells, wherein the relative difference between the two total resistances is plotted in the diagram.

Referring to FIGS. 4, 5A, 5B, 6A, and 6B, the calculation of the total resistance of example networks of temperature-dependent resistors will be described where one of the resistors is brought to an elevated temperature.

FIG. 4 is a diagram showing the total resistance $R_{tot}$ of a parallel NTC network (using, as an example, the temperature characteristic of the Murata NCP15XH103J03RC as already shown in FIG. 3 for each of the NTC thermistors). The network includes 24 NTC thermistors, each being thermally connected to a respective single battery cell of a battery module having 24 battery cells; in other words: each battery cell is equipped with one thermistor. It is assumed that 23 cells are at a (mean or ambient) temperature $T_{amb}$ but one single cell is at a temperature $T_{hot}$. The different curves shown are for different values of the ambient temperature $T_{amb}$ (see the legend); different values of the temperature $T_{hot}$ of the single cell are plotted along the abscissa. The resulting total resistance $R_{tot}$ is plotted along the ordinate. Data points for points where the ambient temperature $T_{amb}$ equals the temperature $T_{hot}$ of the single cell (i.e., where $T_{amb}=T_{hot}$) (i.e., where all cells are at the same temperature) are marked with dots.

Referring to FIG. 5A, the detection of a single battery cell with overtemperature in a parallel NTC network is explained (again using, as an example, the temperature characteristic of the Murata NCP15XH103J03RC as shown in FIG. 3). The network includes 24 NTC thermistors, each thermally connected to a respective battery cell of a battery module having 24 battery cells; in other words: each battery cell is equipped with one thermistor. In a first calculation, a total resistance $R_{tot}^{(1)}$ is calculated with each cell being at the same temperature $T_{amb}$, and in a second calculation, a total resistance $R_{tot}^{(2)}$ is calculated with only 23 cells at the temperature $T_{amb}$ and only one cell at a temperature $T_{hot}$. Then, in the diagram of FIG. 5A, the absolute value of the difference between the two total resistances calculated in the first and the second calculation, $\Delta R_{tot}:=R_{tot}^{(1)}-R_{tot}^{(2)}$ is plotted (in units of ° C.) over the temperature of the single cell at the temperature $T_{hot}$ (note that $R_{tot}^{(1)} > R_{tot}^{(2)}$ if $T_{hot} > T_{amb}$ and the plotted values are positive; see also the above remarks as to FIG. 3). The different curves shown are for different values of $T_{amb}$ (see the legend of the diagram); different values of $T_{hot}$ (in units of ° C.) are plotted along the abscissa.

The diagram shown in FIG. 5B is based on the same calculations as explained above in the context of FIG. 5A, i.e., a first calculation yielding the total resistance $R_{tot}^{(1)}$ for each cell being at the same temperature $T_{amb}$ and a second calculation yielding the total resistance $R_{tot}^{(2)}$ for only 23 cells at the temperature $T_{amb}$ and one cell at a temperature $T_{hot}$, wherein a parallel NTC network is assumed (again using, as an example, the temperature characteristic of the Murata NCP15XH103J03RC as shown in FIG. 3). However, unlike to FIG. 5A showing the absolute value of the difference between the two total resistances calculated in the second and the first calculation, FIG. 5B shows the value of the difference between the total resistances calculated in the first and the second calculation relative to the total resistance without overtemperature; in other words: the values for $\Delta R_{tot}/R_{tot}^{(1)}$ with $\Delta R_{tot}(T_{hot}) := R_{tot}^{(1)} - R_{tot}^{(2)}$ are plotted in FIG. 5B over the temperature of the single cell at the temperature $T_{hot}$ (values shown in percent). The different curves shown are for different values of $T_{amb}$ (see the legend of the diagram); different values of $T_{hot}$ (in units of ° C.) are plotted along the abscissa.

While FIGS. 5A and 5B show the results for a network formed by a parallel circuit of NTC thermistors (see FIG. 2(A)), FIGS. 6A and 6B show the corresponding results for a network formed by a serial circuit of NTC thermistors (see FIG. 2(B)), wherein again, the temperature characteristic of the Murata NCP15XH103J03RC (as shown in FIG. 3) for each of the NTC thermistors is assumed.

With the help of the diagram of FIG. 6A, the detection of a single cell with overtemperature in a serial NTC network is explained. Again, the network includes 24 NTC thermistors, each thermally connected to a battery cell of a battery module having 24 battery cells; in other words: each battery cell is equipped with one thermistor. In a first calculation, a total resistance $R_{tot}^{(1)}$ is calculated with each cells being at the same temperature $T_{amb}$, and in a second calculation, a total resistance $R_{tot}^{(2)}$ is calculated with only 23 cells at the temperature $T_{amb}$ and only one cell at a temperature $T_{hot}$. Then, in the diagram of FIG. 6A, the absolute value of the difference between the two total resistances calculated in the first and the second calculation, $\Delta R_{tot} := R_{tot}^{(1)} - R_{tot}^{(2)}$ is plotted (in units of ° C.) over the temperature of the single cell at the temperature $T_{hot}$. The different curves shown are for different values of $T_{amb}$ (see the legend of the diagram); different values of $T_{hot}$ (in units of ° C.) are plotted along the abscissa.

Correspondingly, the diagram shown in FIG. 6B is based on the same calculations as explained above in the context of FIG. 6A, i.e., a first calculation yielding the total resistance $R_{tot}^{(1)}$ for each cells being at the same temperature $T_{amb}$ and a second calculation yielding the total resistance $R_{tot}^{(2)}$ for only 23 cells at the temperature $T_{amb}$ and one cell at a temperature $T_{hot}$, wherein a serial NTC network is assumed. However, unlike to FIG. 6A showing the absolute value of the difference between the two total resistances calculated in the second and the first calculation, FIG. 6B shows the value of the difference between the total resistances calculated in the first and the second calculation relative to the total resistance without overtemperature; in other words: the values for $\Delta R_{tot}/R_{tot}^{(1)}$ with $\Delta R_{tot}(T_{hot}) := R_{tot}^{(1)} - R_{tot}^{(2)}$ are plotted in FIG. 6B over the temperature of the single cell at the temperature $T_{hot}$ (values shown in percent). The different curves shown are for different values of $T_{amb}$ (see the legend of the diagram); different values of $T_{hot}$ (in units of ° C.) are plotted along the abscissa.

As will be understood referring to FIGS. 5A to 6B, there is a detectable difference between the case where all cells are at the same ambient temperature $T_{amb}$ and the case where one single cell has an overtemperature $T_{hot}$.

In a parallel network, the relative difference of the network's total resistance between the case where all cells are at the same temperature vs. the case where one cell has overtemperature is much more pronounced (see FIG. 5B). Therefore, a measurement of said relative difference is technically easier to implement in case of a parallel network than in case of a serial network. Embodiments based on a measurement of the relative difference of the total resistance of a parallel NTC thermistor network may therefore be easier to implement. However, embodiments may also be based on a measurement of the relative difference of the total resistance of a serial NTC thermistor network (see FIG. 6B).

Figure 7:
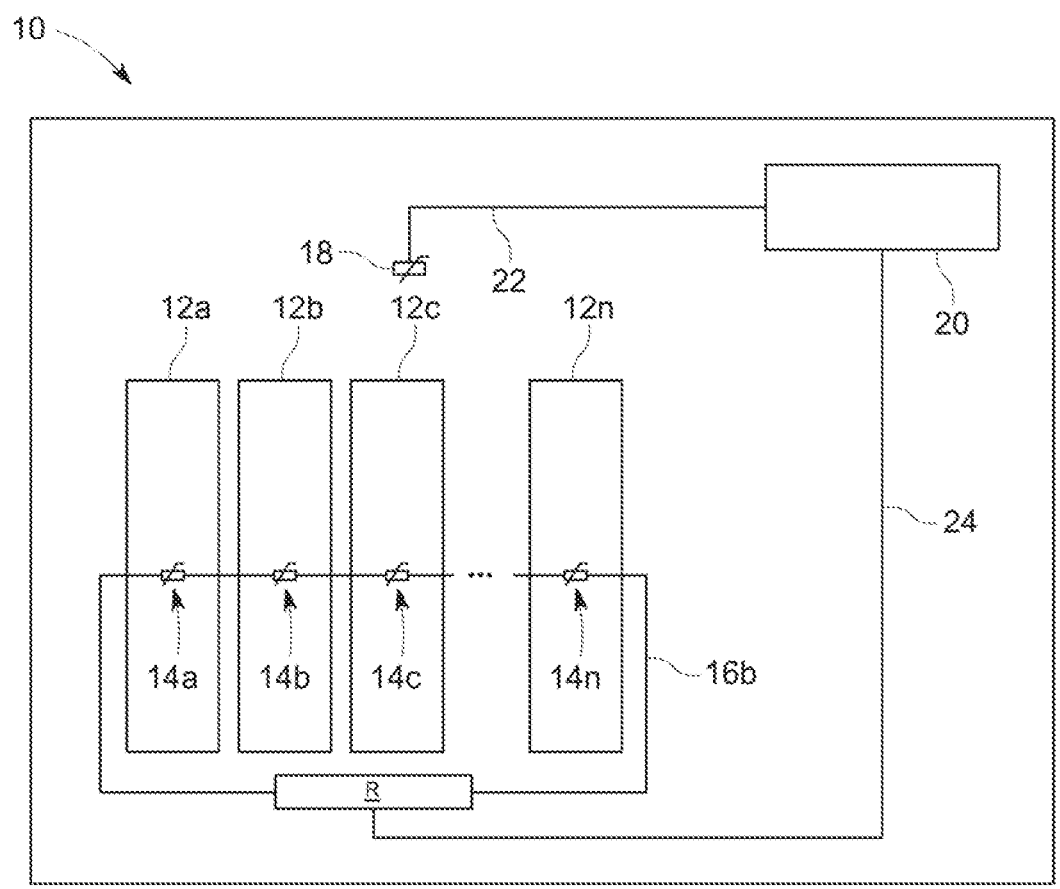
FIG. 7 illustrates schematically the assembly of an embodiment of the monitoring system according to the invention.

FIG. 7 illustrates schematically the assembly of an embodiment of the monitoring system according to the invention.

FIG. 7 illustrates schematically a battery module 10 including the plurality of battery cells 12a, 12b, 12c, ..., 12n that are thermally connected to a thermistor network including a serial connection of temperature-dependent resistors 14a, 14b, 14c, ..., 14n as described above in detail in the context of FIG. 1. The battery module 10 further includes a battery management unit (BMU) and one additional temperature sensor 18. The BMU 20 acts as a monitoring device 20 and is connected to the resistance measurement circuit R via an electric connection 24 and to the additional temperature sensor 18 via an electric connection 22 to receive signals from the resistance measurement circuit R and from the additional temperature sensor 18, respectively, such that these signals can then be evaluated. In another implementation, the resistance measurement circuit R may be integrated into the monitoring device 20 (e.g., integrated into the BMU).

The additional temperature sensor 18 may provide a signal to the monitoring device 20, the signal corresponding to a mean temperature within the battery module 10 that is taken to correspond (or at least approximately correspond) to the ambient temperature $T_{amb}$ of the battery cells 12a, 12b, 12c, ..., 12n. The monitoring device 20 is adapted such that, when provided with the ambient temperature $T_{amb}$ of the battery cells as input, the monitoring device 20 is capable of calculating the overheating of a single cell. Under the assumption that only a single cell is affected by overheating and that all temperature-dependent resistors 14a, 14b, 14c, ..., 14n are NTC thermistors of the type as described in the context of FIG. 3, this can be done by a calculation as explained above in the context of FIG. 6A or 6B with the difference that now, the temperature $T_{hot}$ of the single overheated cell is evaluated (or estimated) in dependence of the ambient temperature $T_{amb}$ (i.e., the input yielded by the additional temperature sensor 18) and the measured difference of the network's (absolute or relative) total resistance calculated based on the signals generated and provided to the monitoring device 20 by the resistance measurement circuit R. Thus, the monitoring device 20 calculates the inverse functions of the functions shown in FIG. 6A or 6B, i.e., the monitoring device 20 calculates, for a given ambient temperature $T_{amb}$, the temperature $T_{hot}$ of an overheated battery cell (the abscissa in the diagrams of FIGS. 6A and 6B) in dependence of the network's (absolute or relative) total resistance (the ordinate in the diagrams of FIGS. 6A and 6B).

Then, the monitoring device 20 may compare the calculated temperature $T_{hot}$ of a (possibly) overheated battery cell with a threshold temperature $T_{thresh}$ in order to detect an overheating in one of the cells. The threshold value $T_{thresh}$ may depend on the ambient temperature $T_{amb}$.

Due to the monotony of the functions (i.e., the curves plotted in FIGS. 6A and 6B), explicitly calculating the temperature $T_{hot}$ of the single overheated cell may be omitted and, instead, the measured total resistance of the network may be directly compared to a threshold value $R_{thresh}$ for the resistance that corresponds to the threshold temperature $T_{thresh}$ and is thus likewise dependent on $T_{amb}$.

The above may be applied correspondingly to a network formed by a parallel connection of temperature-dependent resistors as depicted in FIG. 2(A).

By way of summation and review, to meet the dynamic power demands of various electrical consumers connected to a battery system, a static control of battery power output and charging may not be sufficient. Thus, steady exchange of information between the battery system and the controllers of the electrical consumers may be implemented. This information may include the battery system's actual state of charge (SoC), potential electrical performance, charging ability, and internal resistance, as well as actual or predicted power demands or surpluses of the consumers.

Battery systems may include a battery management system (BMS) and/or battery management unit (BMU) for processing the aforementioned information. The BMS/BMU may communicate to controllers of the various electrical consumers via a suitable communication bus, e.g. a SPI or CAN interface. The BMS/BMU may further communicate with each of the battery submodules, for example, with a cell supervision circuit (CSC) of each battery submodule. The CSC may be further connected to a cell connection and sensing unit (CCU) of a battery submodule that interconnects the battery cells of the battery submodule.

Thus, the BMS/BMU may be provided for managing the battery pack, such as by protecting the battery from operating outside its safe operating area, monitoring its state, calculating secondary data, reporting that data, controlling its environment, authenticating it, and/or balancing it.

To provide thermal control of the battery pack, an active or passive thermal management system may be implemented to safely use the at least one battery module by efficiently emitting, discharging, and/or dissipating heat generated from its rechargeable batteries. If the heat emission/discharge/dissipation is not sufficiently performed, temperature deviations may occur between respective battery cells, such that the at least one battery module may not generate a desired amount of power. In addition, an increase of the internal temperature may lead to abnormal reactions occurring therein, and thus charging and discharging performance of the rechargeable battery may deteriorate and the life-span of the rechargeable battery may be shortened. Thus, cell cooling for effectively emitting/discharging/dissipating heat from the cells may be implemented.

In a general battery module/battery pack, temperature of individual cells inside the battery module/battery pack may be determined using a model that takes into account the absolute temperature measured at just a few points inside the module/battery pack to identify a temperature anomaly (e.g., overtemperature), or an anomaly may be detected using changes in the electrical characteristics of the involved cells. As a safety feature, the battery cells may have an OSD (Overcharge Safety Device) installed that reacts to, e.g., overtemperature, via detection of the gas buildup. In this approach just described, temperature anomalies (e.g., overtemperature) of individual cells may not be reliably detected. For example, only measuring that one or at least one of the cells exceeds a certain threshold value is not determinative of whether or not a thermal anomaly occurs inside at least one of the cells of the battery module, as exceeding the temperature threshold may also depend on the ambient temperature.

As described above, embodiments relate to a monitoring system including a network of temperature-dependent resistors (thermistors).

Embodiments may provide a monitoring system that exhibits an improved reliability with regard to the detection, whether or not a thermal anomaly occurs in a cell of a battery module. Embodiments may also provide a battery module including such a monitoring system and a vehicle equipped with at least one of such battery modules. Embodiments may also provide a method for monitoring the temperature of the battery cells of a battery module using the monitoring system.

Embodiments may be implemented using inexpensive sensor technology, and may provide for reliable detection of thermal anomalies at a very low cost.

Temperature anomalies may be due to different error scenarios and detection of a temperature anomaly may be handled in various manners. For instance, in case of cold temperatures, the maximum power may be adapted to the coldest cell. In case of overtemperature of a cell, the requested cooling power may be adapted to the hottest cell. If a cell has overtemperature above the limits of safe operation, the relay of the battery pack can be opened. Using the monitoring system and/or the method according to embodiments may allow for inexpensive detection of a critical state of an individual cell.

REFERENCE SIGNS 10 battery module
12a, 12b, 12c, 12n battery cells
14a, 14b, 14c, 14n temperature-dependent resistors
16a parallel connection of temperature-dependent resistors
16b serial connection of temperature-dependent resistors
18 additional temperature sensor
20 battery management unit (BMU)
22, 24 electric connections
R resistance measurement circuit R
$R_{tot}$ total resistance of a network of temperature-dependent resistors
$T_{amb}$ ambient/mean temperature within the battery module
$T_{hot}$ temperature of an overheated battery cell Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A monitoring system for monitoring the temperature of a battery module having a plurality of battery cells, the monitoring system comprising:
    an electric network including a plurality of thermistors, wherein each of the thermistors is thermally connected to a battery cell, and wherein the electric network includes both a parallel connection of some of the plurality of thermistors and a series connection of other of the plurality of thermistors;
    a monitoring device adapted to:
        measure a total resistance ($R_{tot}$) of the electric network including the plurality of thermistors;
        detect a first condition in at least one of the plurality of battery cells when the measured total resistance ($R_{tot}$) exceeds a first threshold resistance value;
        detect a second condition in at least one of the plurality of battery cells when the measured total resistance ($R_{tot}$) falls below a second threshold resistance value; and
        generate a signal in case of detecting the first condition or the second condition,
    wherein the monitoring system is adapted to determine a mean temperature ($T_{amb}$) of the battery module independently from the measurement of the total resistance ($R_{tot}$) of the electric network,
    wherein the first threshold resistance value and the second threshold resistance value are dependent on the mean temperature ($T_{amb}$) of the battery module,
    wherein one of the first condition and the second condition is an undertemperature condition, and the other of the first condition and the second condition is an overtemperature condition,
    wherein the monitoring system is adapted to detect a resistance value of one of the thermistors separately, and
    wherein the monitoring device is adapted to use the detected resistance value of the separately detected thermistor to determine the mean temperature ($T_{amb}$) of the battery module.

2. The monitoring system of claim 1, wherein the number of thermistors is smaller or equal to the number of battery cells, and wherein each battery cell is connected to at most one thermistor and each thermistor is connected to one and only one battery cell.

3. The monitoring system of claim 1,
    wherein the electric network is adapted such that the total resistance ($R_{tot}$) of the electric network decreases when a temperature of at least one of the thermistors increases and temperature of the remaining thermistors is constant.

4. The monitoring system of claim 3, wherein each of the thermistors is a negative thermal coefficient thermistor.

5. The monitoring system of claim 1,
    wherein the electric network is adapted such that the total resistance ($R_{tot}$) of the electric network increases when a temperature of at least one of the thermistors increases and temperature of the remaining thermistors is constant.

6. The monitoring system of claim 5, wherein each of the thermistors is a positive thermal coefficient thermistor.

7. A battery module having a plurality of battery cells, the battery module comprising the monitoring system of claim 1.

8. A method for monitoring temperature of battery cells of a battery module, the method comprising:
    a) detecting a mean temperature ($T_{amb}$) of the battery module;
    b) measuring a total resistance ($R_{tot}$) of an electric network including a plurality of thermistors, wherein each of the thermistors is thermally connected to a battery cell, and wherein the electric network includes both a parallel connection of some of the plurality of thermistors and a series connection of other of the plurality of thermistors;
    c) detecting a first condition in at least one of the plurality of battery cells when the measured total resistance ($R_{tot}$) exceeds a first threshold resistance value;
    d) detecting a second condition in at least one of the plurality of battery cells when the measured total resistance ($R_{tot}$) falls below a second threshold resistance value; and
    e) generating a signal in case of detecting the first condition or the second condition,
    wherein the first threshold resistance value and the second threshold resistance value are dependent on the mean temperature ($T_{amb}$) of the battery module,
    wherein one of the first condition and the second condition is an undertemperature, and the other of the first condition and the second condition is an overtemperature condition, and
    wherein detecting the mean temperature ($T_{amb}$) includes detecting resistance values of one of the thermistors separately, and determining the mean temperature ($T_{amb}$) of the battery module using the detected resistance value of the separately detected thermistor.

9. The method of claim 8, wherein a) to e) are repeated during use of the battery module.

10. The method of claim 8, wherein each of the thermistors is a negative thermal coefficient thermistor, and
    wherein e) includes generating the signal when the second condition is detected.

11. The method of claim 8, wherein each of the thermistors is a positive thermal coefficient thermistor, and
    wherein e) includes generating the signal when the first condition is detected.

* * * * *